United States Patent [19]
Nourrcier

[11] Patent Number: 5,576,599
[45] Date of Patent: Nov. 19, 1996

[54] LOW EMI HIGH INTENSITY DISCHARGE RF DRIVEN LAMP

[75] Inventor: Charles E. Nourrcier, Lakewood, Calif.

[73] Assignee: Hughes Aircraft Company, Los Angeles, Calif.

[21] Appl. No.: 478,638

[22] Filed: Jun. 7, 1995

[51] Int. Cl.$^6$ ........................................ H01J 1/00
[52] U.S. Cl. ........................... 315/85; 315/267; 315/338; 315/344
[58] Field of Search .................................. 331/78; 315/85, 315/267, 344, 248, 348, DIG. 5, DIG. 7, 338

[56] References Cited

U.S. PATENT DOCUMENTS

| | | | |
|---|---|---|---|
| 4,187,447 | 2/1980 | Stout et al. | 315/85 |
| 4,383,203 | 5/1983 | Stanley | 315/248 |
| 4,507,796 | 3/1985 | Stumfall | 375/106 |
| 5,056,912 | 10/1991 | Hamada et al. | 353/38 |
| 5,118,196 | 6/1992 | Ault et al. | 362/123 |

Primary Examiner—Robert Pascal
Assistant Examiner—David H. Vu
Attorney, Agent, or Firm—Leonard A. Alkov; Wanda K. Denson-Low

[57] ABSTRACT

A high intensity discharge light source that uses a pseudo-random sequence generator to modulate an RF drive signal, and reduce electromagnetic interference (EMI) produced by the light source. The light source includes a high intensity RF discharge lamp, control and RF drive electronics that are coupled between a power source and the lamp. The control and drive electronics include an electromagnetic interference filter, and a regulator that outputs a bias voltage. The drive electronics provide RF power to the lamp, and includes an oscillator, a mixer/modulator, an amplifier, and an impedance matching network. The control circuit includes a pseudo-random sequence generator that generates a pseudo-random sequence of pulses to modulate the mixer/modulator and thus the output of the oscillator to thereby reduce the EMI spectral density generated in driving the RF discharge lamp.

2 Claims, 2 Drawing Sheets

Fig. 1
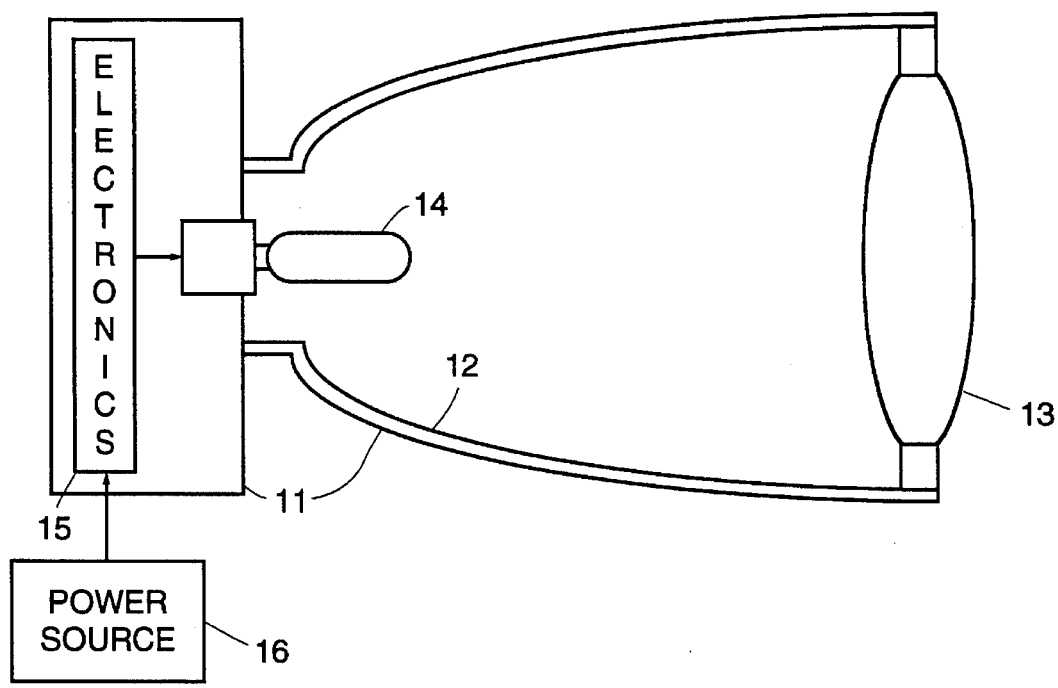
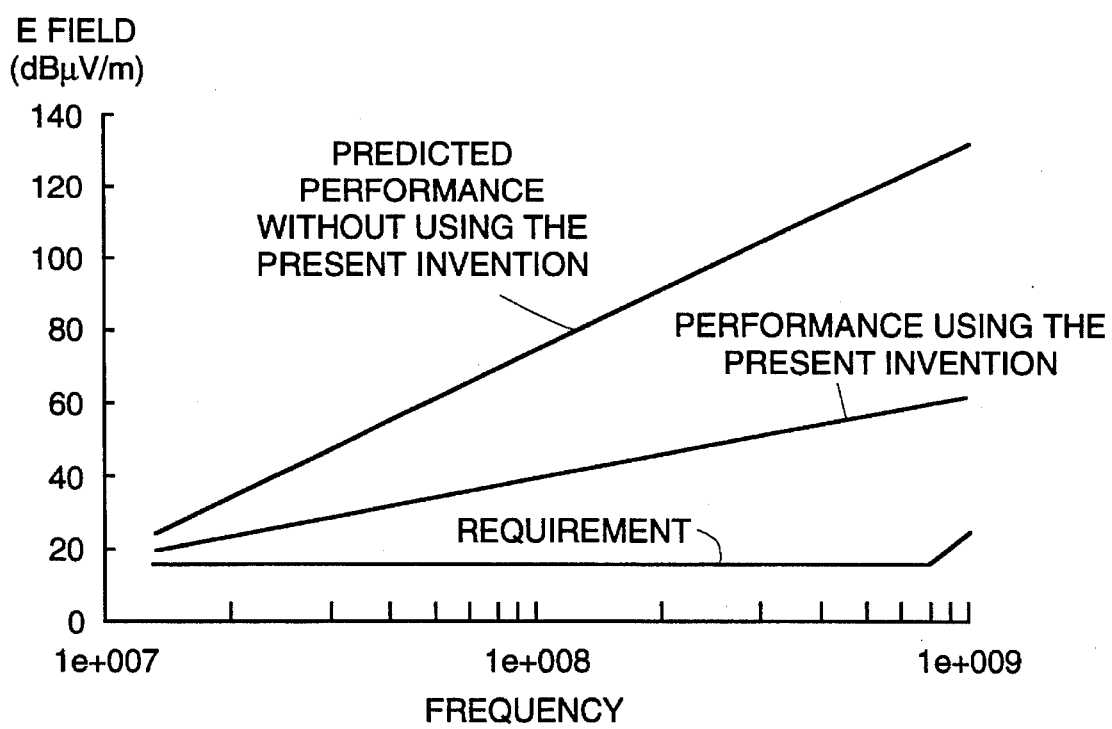
Fig. 4

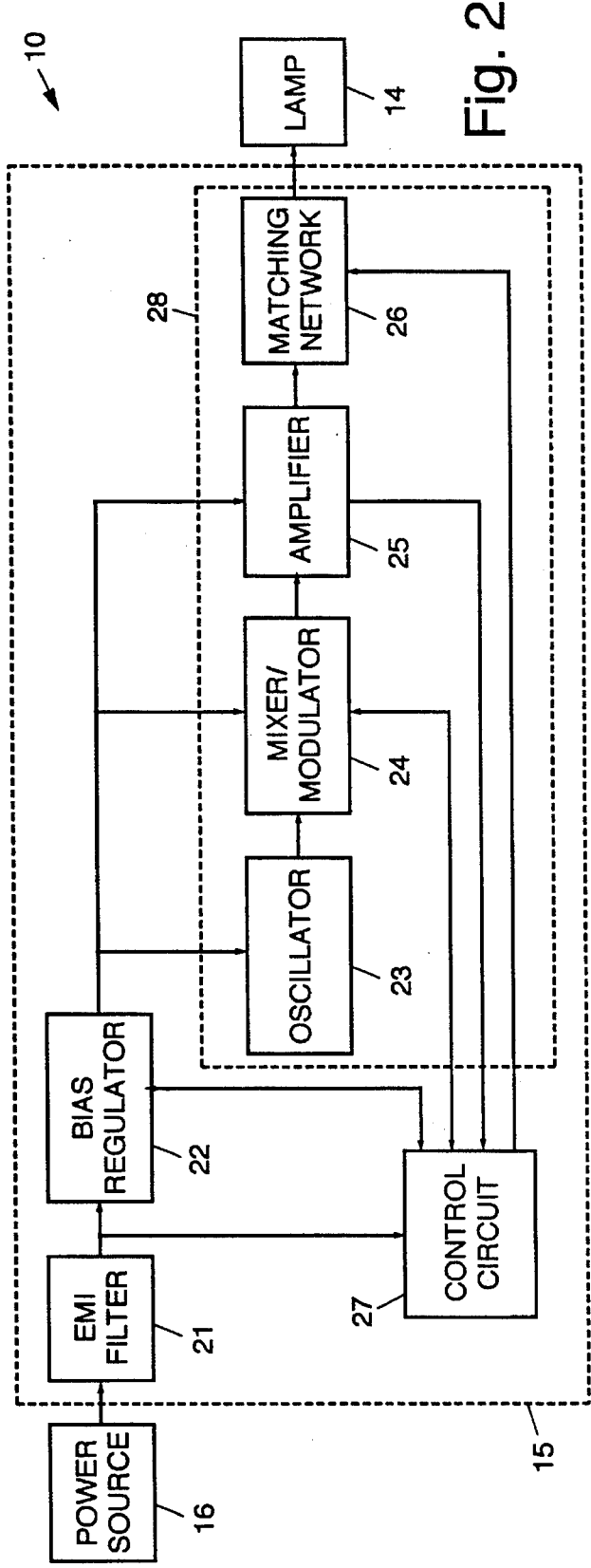
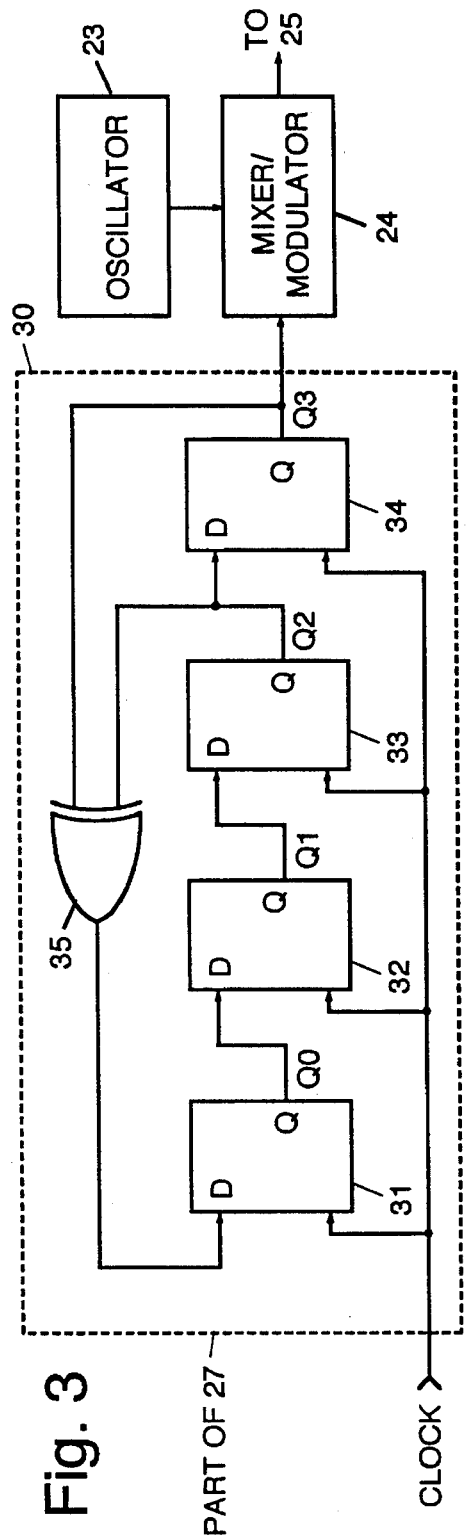

LOW EMI HIGH INTENSITY DISCHARGE RF DRIVEN LAMP

BACKGROUND

The present invention relates generally to high intensity lamps, and more particularly, to a high intensity discharge RF driven lamp for vehicles that produces low levels of electromagnetic interference (EMI).

The assignee of the present invention develops high intensity discharge headlamps for vehicles, and the like. Currently developed RF driven high intensity discharge lamps have a problem relating to the production of electromagnetic interference. RF power required to drive the lamps can exceed 100 watts at frequencies around 200 MHz. The desired radiated emissions specification for the high intensity discharge lamps exceeds FCC part 15 specifications by more than 20 dB. This means that EMI containment must provide more than 100 dB of isolation (with respect to the power generated by the RF power supply). This problem is aggravated by the fact that the lamp used in the currently developed lighting systems exposed so that light can efficiently provide illumination. The exposed lamp has a large RF voltage across its terminals. Because the currently developed lamp generates high RF and EMI levels, it is possible that such levels could inadvertently deploy vehicle airbags when the lamps are turned on, or interfere with other systems in the vehicle such as cellular phones, radios, or braking systems, and the like.

Accordingly, it is an objective of the present invention to provide for improved high intensity discharge RF driven headlight for use in vehicles, and the like, that produces low levels of electromagnetic interference (EMI).

SUMMARY OF THE INVENTION

To meet the above and other objectives, the present invention is a high intensity discharge light source or lamp that uses a pseudo-random sequence generator to modulate an RF drive signal, and reduce electromagnetic interference (EMI) produced by the light source. In a reduced to practice embodiment, the pseudo-random sequence generator modulates a 100 watt RF signal that is used to power high intensity discharge headlamps for vehicles.

More specifically, the high intensity discharge lamp includes a housing that secures a reflector, a high intensity RF discharge lamp, and a lens, and houses control and RF drive electronics that are coupled between a power source and the RF discharge lamp. The control and drive electronics include an electromagnetic interference (EMI) filter that is coupled to the power source. The filtered voltage output of the EMI filter is coupled to a bias regulator that outputs a predetermined bias voltage, typically between 22 and 28 volts. The EMI filter is coupled to a control circuit, and to drive electronics that provide RF power to the RF discharge lamp. The drive electronics include an oscillator, a mixer/modulator, amplifier, and impedance matching network. The control circuit is coupled to the mixer/modulator and amplifier and generates a pseudo-random sequence of pulses that drives the mixer/modulator to modulate the oscillator and reduce the EMI density output generated in driving the RF discharge lamp. In a reduced to practice embodiment, the control circuit comprises a linear feedback shift register that generates a fifteen-state sequence that drives the mixer/modulator.

The present invention uses a relative low speed simple linear feedback shift register to implement a pseudo-random sequence generator to modulate the RF signal used to power the high intensity discharge headlamp. The linear feedback shift register may be implemented within the control integrated circuit, therefore adding no recurring costs and eliminating several expensive integrated circuits. The sequence produced by the sequence generator is used to modulate an RF oscillator phase. This spreads the RF energy over a broad bandwidth. By using coded modulation, the RF high intensity discharge lamp produces a low amount of interference that does not impact other systems. In addition, the RF energy has the appearance of noise when viewed with a spectrum analyzer. Therefore, by spreading the energy over 1000 communication channels, for example (10 Mhz, for example), effectively reduces the EMI by 30 dB. The oscillator is a simple, highly efficient LC oscillator that uses a low-cost varactor diode. Frequency stability is not an important factor.

The present invention reduces parts costs and the EMI power spectral density generated by the fundamental RF drive signal produced by the control electronics by more than three orders of magnitude. The EMI problem is reduced with each higher order harmonic of the RF drive signal. The present invention thus overcomes technical barriers required to make high intensity discharge headlamps practical and low cost. The present invention significantly lowers the cost of high intensity discharge lamps while generating 1000 times less EMI density that currently developed lamps.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates a cross sectional side view of a projector lamp assembly comprising a low EMI, high intensity discharge RF driven lamp in accordance with the principles of the present invention;

FIG. 2 shows a block diagram of the high intensity discharge lamp of FIG. 1;

FIG. 3 shows a 15 state sequence generator used to modulate an oscillator used in the high intensity discharge lamp of FIG. 1; and FIG. 4 shows graphs of predicted EMI versus frequency and the desired requirement for the high intensity discharge RF driven lamp shown in FIG. 1.

DETAILED DESCRIPTION

Referring to the drawing figures, FIG. 1 illustrates a cross sectional side view of a projector lamp assembly comprising a low EMI, high intensity discharge RF driven lamp 10, or light source 10, in accordance with the principles of the present invention. The RF driven lamp 10 includes a housing 11 that secures a reflector 12 and a lens 13, and an RF discharge lamp 14 is disposed such that light emitted therefrom reflects off of the reflector 12 and is projected by the lens 13. A power source 16, such as a battery, for example, is provided and a control circuit 15, or ballast circuit 15, is coupled between the power source 16 and the RF discharge lamp 14. Details of the construction of the RF driven lamp 10 are given below with reference to FIGS. 2–4.

Referring to FIG. 2, it is a block diagram of the high intensity RF discharge lamp 10 of FIG. 1. The ballast circuit 15, or control circuit 15, for the lamp 10 includes an EMI filter 21 that is coupled to the power source 16, and a bias regulator 22 is coupled to the EMI filter 21 for producing a regulated DC output voltage in the range of from 22 to 28 volts DC, for example. An RF discharge source 28 is coupled between the bias regulator 22 and the lamp 14 that comprises an oscillator 23, a mixer/modulator 24 coupled to the oscillator 23, an amplifier 25 coupled to the mixer/modulator 24, and an impedance matching network 26 coupled to the amplifier 25. Another control circuit 27 is coupled to the EMI filter 21, the bias regulator 22, the mixer/modulator 24, and the amplifier 25, that comprises pseudo-random sequence generator 30 such as a linear feedback shift register 30 (FIG. 3) that generates a pseudo-random sequence of pulses to control the oscillator 23 and thus control light output produced by the lamp 14 to reduce EMI output generated while driving the lamp 14.

In a prior embodiment of the lamp over which the present invention is an improvement, the prior RF discharge source is operated at a frequency that falls in a deadband between two communication channels. This requires extreme frequency stability. The frequency stability and operating frequency (approximately 200 MHz) of the RF oscillator required the use of a crystal controlled phase locked loop therein. Extra integrated circuits operating at the oscillator frequency were required to make the phase locked loop work. These extra integrated circuits included a prescalar, a loop integrator operational amplifier and a phase/frequency detector. However, in the present light source 10, the oscillator 23 is a simple, highly efficient LC oscillator 23 that uses a low-cost varactor diode. Frequency stability is not an important factor for the presently-used oscillator 23.

Referring to FIG. 3, it shows one specific embodiment of the pseudo-random sequence generator 30 that comprises a 15 state sequence generator 30 that is used to modulate the oscillator 23 of the high intensity RF discharge lamp 10 of FIG. 1. The sequence generator 30 shown in FIG. 3 may be any type of circuit capable of synthesizing a pseudo-random sequence. The length of the sequence may vary depending upon the particular application. Consequently, the present invention is not limited to the specific embodiment of the sequence generator 30 shown in FIG. 3.

The sequence generator 30 is part of the control circuit 27 and comprises four D-type flip flops 31, 32, 33, 34 and a two-input XNOR gate 35. A clock input signal is coupled to respective clock inputs of the D-type flip flops 31–34. The outputs of the third and fourth D-type flip flops 33, 34 are coupled to respective inputs of the two-input XNOR gate 35. The output of the two-input XNOR gate 35 is fed back to the D input of the first D-type flip flop 31. The output of the fourth D-type flip flop 34 is coupled to the mixer/modulator 24 and provides the pseudo-random sequence of pulses that is used to modulate the output of the oscillator 23.

Although not shown, the control circuit 27 also includes circuitry for controlling the bias regulator 22 and the gain of the amplifier 25 and circuitry for adjusting the matching network 26. These circuits and functions are well known and are routinely implemented in the art and therefore will not be described in detail herein. The control circuit 27 comprises an integrated circuit that integrates the power regulation and control functions required for operation of the high intensity discharge lamp 10. This integrated circuit 27 contains logic that implements the low frequency shift register 30 shown in FIG. 3 that modulates the oscillator 23.

The projector lamp assembly shown in the FIG. 1 was used to model electromagnetic interference (EMI) produced thereby without the use of the present invention. FIG. 4 shows graphs of the specification requirement, a plot of predicted EMI versus frequency for a light source without the present invention, and a plot of EMI versus frequency plot for the high intensity discharge RE driven lamp 10 described with reference to FIGS. 2 and 3. As is evident from FIG. 3, at 200 MHz, there is a >70 dB EMI problem with the prior light source. This plot is illustrative of single tone EMI emissions. While the present invention does not reduce EMI emissions to below the desired level of the specification, it does produce EMI emissions that are on the order of 1000 times lower than EMI emissions from currently developed light sources.

Referring again to FIG. 3, it shows the 15 state sequence generator 30, or pseudo-random sequence generator 30, used to modulate the oscillator 23. The pseudo-random sequence generator 30, also known as a linear feedback shift register 30 is a simple shift register with feedback from two or more points or taps thereof. For a 15 state sequence, only four D-type flip-flops 31–34 and the two-input XNOR gate 35 are required. Longer counters may require a larger XNOR feedback, but the number of taps do not increase with a larger number of bits. The output of the oscillator 23 is a spread-spectrum output signal in which a carrier is bi-phase shift keyed (BPSK) modulated by a digital code sequence having a bit rate much higher than the resolution bandwidth of an EMI measuring device used to measure the spectrum.

The spread-spectrum output signal is a line spectrum with frequencies at multiples of the fundamental frequency of the sequence generator 30. A scale factor is present that is inversely proportional to the period of the sequence. Thus, if the period of the sequence is doubled, lines in the spectrum become twice as dense, but the power in each is reduced by a factor of two. This is because the binary waveform is a constant amplitude square wave and therefore has constant power. The envelope of the spectrum, which is a $(\sin x/x^2)$ function, is determined by the digit period of the waveform. Therefore, the bandwidth spreading function is independent of the length of the coded waveform, but is determined solely by the digit period, (how often the waveform switches).

The present invention uses the relative low speed linear feedback shift register 30 to implement a pseudo-random sequence generator 30 to modulate the RF signal used to power the discharge lamp 14. The linear feedback shift register 30 may be implemented in the control circuit 27, therefore adding no recurring costs and eliminating other integrated circuits. The sequence produced by the sequence generator 30 is used to modulate the RF oscillator phase. This spreads the RF energy over a broad bandwidth. By using coded modulation, the RF high intensity discharge lamp 10 produces a low amount of interference that does not impact other systems in the vehicle. In addition, the RF energy has the appearance of noise when it is viewed with a spectrum analyzer. Therefore, by spreading the energy over 1000 communication channels, for example (10 Mhz, for example), effectively reduces the EMI by 30 dB.

The use of RF discharge technology is expected to dramatically change headlamps used in vehicles. The light output of the present RF discharge lamp 10 produces the color of sunlight, unlike conventional tungsten halogen lamps, and thus provides significantly greater illumination. Furthermore, the present high intensity discharge lamp 10 should last the life of a vehicle in which it is employed.

In summary, the present invention uses a simple technique that reduces the power spectral density of an EMI signal that is used to drive RF high intensity discharge lamps 10. The EMI produced by the lamp 10 is reduced so that it does not interfere with other systems in a vehicle or the environment outside of the vehicle.

Thus, a new and improved low EMI, high intensity discharge RF driven lamp that may be employed with vehicles, and the like, has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A high intensity discharge RF drive light source comprising:

a housing;

a reflector secured to the housing;

a lens secured to the housing;

an RF discharge lamp disposed relative to the reflector so as to generate light output that is reflected from the reflector and transmitted out of the housing by way of the lens;

a power source; and a control circuit coupled between the power source and the lamp comprising:

(i) an EMI filter coupled to the power source, (ii) a bias regulator coupled to the EMI filter, (iii) an RF drive source, coupled between the bias regulator and the lamp, that comprises an oscillator, a mixer/modulator, and an impedance matching network coupled to the amplifier, and (iv) a pseudo-random sequence generator coupled to the EMI filter, the bias regulator, the oscillator and the mixer/modulator, said generator comprising flip flops and logic gates, that generates a pseudo-random sequence of pulses to modulate the mixer/modulator and thus control light output produced by the lamp and reduce EMI spectral density output generated while driving the lamp.

2. The light source of claim 1 wherein the pseudo-random sequence generator generates a fifteen state sequence to control the mixer/modulator.

\* \* \* \* \*